(12) United States Patent
Sato et al.

(10) Patent No.: US 10,116,002 B2
(45) Date of Patent: Oct. 30, 2018

(54) PRODUCTION METHOD OF SOLID ELECTROLYTE

(71) Applicant: IDEMITSU KOSAN CO., LTD., Tokyo (JP)

(72) Inventors: Koichi Sato, Sodegaura (JP); Minoru Senga, Sodegaura (JP); Yoshikatsu Seino, Sodegaura (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 98 days.

(21) Appl. No.: 14/893,424

(22) PCT Filed: May 30, 2014

(86) PCT No.: PCT/JP2014/002872
§ 371 (c)(1),
(2) Date: Nov. 23, 2015

(87) PCT Pub. No.: WO2014/192309
PCT Pub. Date: Dec. 4, 2014

(65) Prior Publication Data
US 2016/0104917 A1   Apr. 14, 2016

(30) Foreign Application Priority Data

May 31, 2013 (JP) ................................. 2013-115223
Jan. 16, 2014 (JP) ................................. 2014-006012

(51) Int. Cl.
*H01M 10/0562* (2010.01)
*C01B 17/22* (2006.01)
*H01B 1/10* (2006.01)
*H01M 10/0525* (2010.01)
*H01M 10/052* (2010.01)

(52) U.S. Cl.
CPC ......... *H01M 10/0562* (2013.01); *C01B 17/22* (2013.01); *H01B 1/10* (2013.01); *H01M 10/052* (2013.01); *H01M 10/0525* (2013.01); *C01P 2004/61* (2013.01); *C01P 2006/12* (2013.01); *C01P 2006/14* (2013.01); *C01P 2006/80* (2013.01); *H01M 2220/20* (2013.01); *H01M 2220/30* (2013.01); *H01M 2300/0068* (2013.01); *Y02T 10/7011* (2013.01)

(58) Field of Classification Search
CPC ......... H01M 10/0525; H01M 10/0562; H01M 2300/0068; H01M 2220/20; H01M 2220/30; H01M 2300/0065
See application file for complete search history.

(56) References Cited

U.S. PATENT DOCUMENTS

| 5,958,281 | A | 9/1999 | Takada et al. |
| 2007/0196739 | A1 | 8/2007 | Seino et al. |
| 2009/0233178 | A1* | 9/2009 | Saidi .................... H01M 4/1393 429/326 |
| 2010/0200795 | A1 | 8/2010 | Ota et al. |
| 2012/0009484 | A1* | 1/2012 | Aburatani ................. C03C 1/02 429/322 |
| 2014/0227610 | A1 | 8/2014 | Aburatani et al. |
| 2014/0295260 | A1 | 10/2014 | Sugiura et al. |
| 2014/0302382 | A1 | 10/2014 | Kambara et al. |
| 2014/0315102 | A1* | 10/2014 | Tsuji ....................... H01M 4/38 429/322 |
| 2017/0194662 | A1 | 7/2017 | Kambara et al. |

FOREIGN PATENT DOCUMENTS

| JP | 7-330312 A | 12/1995 |
| JP | 9-283156 A | 10/1997 |
| JP | 2008-004459 | 1/2008 |
| JP | 2009176484 | 8/2009 |
| JP | 2010-53257 A | 3/2010 |
| JP | 2010-163356 A | 7/2010 |
| JP | 2010-186744 | 8/2010 |
| JP | 4621139 B2 | 1/2011 |
| JP | 2011-84438 A | 4/2011 |
| JP | 2011-136899 A | 7/2011 |
| JP | 2012-79467 A | 4/2012 |
| JP | 2012-134133 | 7/2012 |
| JP | WO 2013/069243 | 5/2013 |
| WO | WO 2004/093099 A1 | 10/2004 |
| WO | WO 2005/040039 A1 | 5/2005 |
| WO | WO 2009/047977 A1 | 4/2009 |
| WO | WO 2012/026238 * | 3/2012 |
| WO | WO 2013/008089 A1 | 1/2013 |
| WO | WO 2013/076955 * | 1/2013 |
| WO | WO 2013/042371 A1 | 3/2013 |
| WO | WO2013073035 | 5/2013 |

OTHER PUBLICATIONS

Extended Search Report dated Jan. 5, 2017 in European Patent Application No. 14803924.1.
International Preliminary Report on Patentability and Written Opinion dated Dec. 10, 2015 in PCT/JP2014/002872.
International Search Report dated Sep. 2, 2014 in PCT/JP2014/002872.
Zengcai Liu, et al., "Anomalous High Ionic Conductivity of Nanoporous β-Li$_3$PS$_4$" Journal of The American Chemical Society, vol. 135, No. 3, Jan. 2013, pp. 975-978 and cover page.

(Continued)

*Primary Examiner* — Anca Eoff
(74) *Attorney, Agent, or Firm* — Oblon, McClelland, Maier & Neustadt, L.L.P.

(57) ABSTRACT

A method of producing a sulfide-based solid electrolyte including bringing an alkali metal sulfide and a sulfur compound into contact in a mixed solvent of a hydrocarbon solvent and a polar aprotic solvent.

20 Claims, 1 Drawing Sheet

(56) References Cited

OTHER PUBLICATIONS

Office Action dated May 30, 2017 in corresponding Japanese Patent Application No. 2015-519656, with English translation.
Office Action dated Sep. 26, 2017, in corresponding Japanese Patent Application No. 2015-519656 (with English-language Translation).

* cited by examiner

PRODUCTION METHOD OF SOLID ELECTROLYTE

TECHNICAL FIELD

The invention relates to a method of producing a solid electrolyte.

BACKGROUND ART

Recently, demand for a lithium ion rechargeable battery increases which is used for a portable information terminal, a mobile electronic equipment, a small power storage device for household use, an motorcycle using a motor as the power source, an electric vehicle, a hybrid electric vehicle and the like.

As a method of ensuring the safety of a lithium ion rechargeable battery, an all-solid rechargeable battery using an inorganic solid electrolyte in place of an organic electrolyte solution is studied.

As a solid electrolyte for the all-solid rechargeable battery, a sulfide-based solid electrolyte using a sulfide as a raw material is studied, for example. As to a method of producing a sulfide-based solid electrolyte, Patent Documents 1 and 2 disclose, for example, a production of a solid electrolyte by reacting raw materials in N-methyl-2-pyrroridone or a hydrocarbon. Further, Non-Patent Document 1 discloses a production of a solid electrolyte by reacting raw materials in tetrahydrofuran.

RELATED ART DOCUMENTS

Patent Documents

Patent Document 1: WO2004/093099
Patent Document 2: WO2009/047977

NON-PATENT DOCUMENTS

Non-Patent Document 1: J. Am. Chem. Soc. 2013, 135, 975-978 "Anomalous High Ionic Conductivity of Nanoporous β-$Li_3PS_4$"

SUMMARY OF THE INVENTION

An object of the invention is to provide a method of producing a sulfide-based solid electrolyte that can easily proceed with the reaction, and in which the reaction processes have high safety.

There has been a problem in the production of a sulfide-based solid electrolyte that when using a hydrocarbon solvent as a solvent, the reaction does not always proceed easily at room temperature. Likewise, when tetrahydrofuran is used as a solvent in the production of a sulfide-based solid electrolyte, the reaction processes hold considerable problems in safety since tetrahydrofuran has a low ignition point and a low flash point, and a wide range of explosion limit.

The inventors conducted extensive studies. As a result, they found that by using a mixed solvent of a hydrocarbon solvent and a polar aprotic solvent in the production of a sulfide-based solid electrolyte, the reaction can proceed more easily than the case of using hydrocarbon solvent alone, and higher safety can be obtained than the case of using a polar aprotic solvent alone.

According to one aspect of the invention, a method of producing a sulfide-based solid electrolyte comprising contacting an alkali metal sulfide with a sulfur compound in a mixed solvent of a hydrocarbon solvent and a polar aprotic solvent is provided.

According to the invention, there is provided a method of producing a sulfide-based solid electrolyte that can easily proceed with the reaction, and in which the reaction processes have high safety.

MODE FOR CARRYING OUT THE INVENTION

Figure 1:
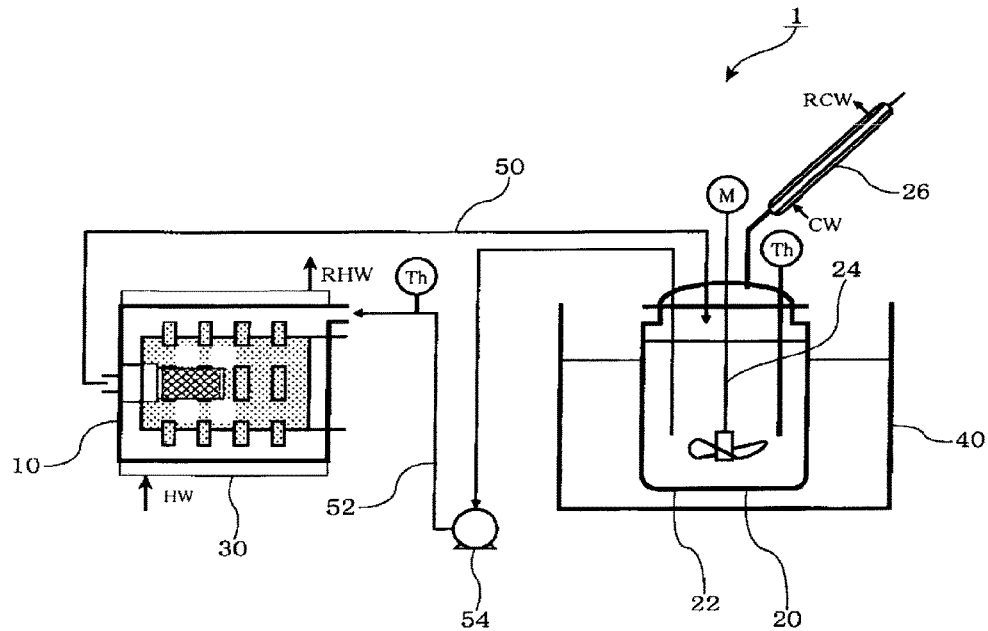
FIG. 1 is an illustration of an example of an apparatus usable for the method of production according to one embodiment of the invention.

The method of producing a sulfide-based solid electrolyte according to one embodiment of the invention includes bringing an alkali metal sulfide and a sulfur compound into contact in a mixed solvent of a hydrocarbon solvent and a polar aprotic solvent.

By the use of the mixed solvent of a hydrocarbon solvent and a polar aprotic solvent in the production of a sulfide-based solid electrolyte, the reaction can proceed more easily than the case of using a hydrocarbon solvent alone, and higher safety can be obtained than the case of using a polar aprotic solvent alone.

In addition to the above-mentioned advantages, the method of producing a sulfide-based solid electrolyte according to one embodiment of the invention has an advantage that risk of explosion or firing during drying the resultant sulfide-based solid electrolyte can be reduced, for the reason that, for instance, when the hydrocarbon solvent is toluene and the polar aprotic solvent is THF, THF is removed ahead while toluene remains.

Further, for instance, $Li_2S$ of the alkali metal sulfide can be produced in toluene of the hydrocarbon solvent. In this case, the sulfide-based solid electrolyte can be produced by just addition of the polar aprotic solvent, without need of complete removing toluene and replacing of toluene with another solvent. As a result, the production process can be shortened.

The method of producing a sulfide-based solid electrolyte according to one aspect of the invention does not need a mill or quench after heating and melting, as employed in the conventional methods.

When mechanical milling is carried out, the surface condition of the resultant solid electrolyte particles may become non-uniform by the particles residing on the inside wall of the mill and those on the balls. When a solid electrolyte particles are formed by rapid quenching after heating and melting to form a solid electrolyte, and pulverizing the obtained solid electrolyte, surface condition of the solid electrolyte particles is hard to become uniform. The method of producing a sulfide-based solid electrolyte according to one aspect of the invention can dissolve these problems.

[Solvent]

The hydrocarbon solvent is a solvent composed of carbon atoms and hydrogen atoms, and includes, for example, saturated hydrocarbons, unsaturated hydrocarbons and aromatic hydrocarbons.

The saturated hydrocarbon solvent includes hexane, pentane, 2-ethylhexane, heptane, octane, decane, cyclohexane, methylcyclohexane, IP SOLVENT 1016 (manufactured by Idemitsu Kosan Co., Ltd.), and IP SOLVENT 1620 (manufactured by Idemitsu Kosan Co., Ltd.). One or more saturated hydrocarbon solvents selected from the group consisting of the above-mentioned solvents can be used.

The unsaturated hydrocarbon includes hexene, heptene and cyclohexene.

The aromatic hydrocarbon includes toluene, xylene, ethylbenzene, decarine, 1,2,3,4-tetrahydronaphthalene, IPSOL 100 (manufactured by Idemitsu Kosan Co., Ltd.), IPSOL 150 (manufactured by Idemitsu Kosan Co., Ltd.).

The hydrocarbon solvent may be used singly or in combination of two or more.

The hydrocarbon solvent is preferably an aromatic hydrocarbon solvent, and more preferable is an aromatic hydrocarbon solvent represented by the following formula (1):

$$Ph\text{-}(R)_n \qquad (1)$$

wherein Ph is an aromatic hydrocarbon group, R is an alkyl group, and n is an integer selected from 1 to 5 (preferably an integer of 1 or 2).

In the formula (1), the aromatic hydrocarbon group for Ph includes a phenyl group, and a naphthacenyl group.

In the formula (1), the alkyl group for R includes a methyl group and an ethyl group.

The aromatic hydrocarbon solvent represented by the formula (1) includes, for example, toluene, xylene and ethylbenzene. Preferred is toluene.

The water content in the hydrocarbon solvent is preferably 50 ppm (weight) or less, in view of the reaction of raw materials and a solid electrolyte to be obtained with water. The reaction with water causes modification of a sulfide-based solid electrolyte, thereby performance of the solid electrolyte deteriorates. Thus, the smaller water content is better. The water content in the hydrocarbon solvent is preferably 30 ppm or less, and more preferably 20 ppm or less.

The polar aprotic solvent is a solvent which has at least one polar group and does not have a proton-donating property.

The polar aprotic solvent includes anisole, acetonitrile, propionitrile, malononitrile, succinonitrile, fumaronitrile, trimethylsilyl cyanide, N-methylpyrrolidone, triethylamine, pyridine, dimethylfolmamide, dimethylacetoamide, nitromethane, carbon disulfide, diethyl ether, diisopropyl ether, t-butyl methyl ether, phenyl methyl ether, dimethoxymethane, diethoxyethane, tetrahydrofuran, dioxane, trimethylmethoxysilane, dimethyl dimethoxysilane, tetramethoxysilane, tetraethoxysilane, cyclohexylmethyldimethoxysilane, acetone, methyl ethyl ketone, acetoaldehyde, ethylene carbonate, propylene carbonate, dim ethyl sulfoxide, methylene chloride, chloroform, dichloroethane, dichlorobenzene, hexafluorobenzene, trifluoromethylbenzene, isobutyronitrile, dioxane, cyclohexanone, and Y-butyrolactone. For the polar aprotic solvent, one or more selected from the group consisting of the above-mentioned solvents can be used.

The polar aprotic solvent is preferably an ether solvent and a nitrile solvent. The ether solvent includes cyclic ether solvents.

The above-mentioned ether solvent includes anisole, diethoxyethane, diethyl ether, and tetrahydrofuran. Of these, the cyclic ether is tetrahydrofuran.

The above-mentioned nitrile solvent includes isobutyronitrile, and acetonitrile.

The polar aprotic solvent may be used singly or in combination of two or more.

In the mixed solvent of the hydrocarbon solvent and the polar aprotic solvent, the mixing ratio of the hydrocarbon solvent and the polar aprotic solvent is preferably 95:5 to 5:95 (volume ratio). For example, the ratio may be 90:10 to 10:90, 80:20 to 20:80, or 70:30 to 30:70.

Here, other solvents may be added as needed. Specifically, the other solvents include ketones such as acetone and methyl ethyl ketone, alcohols such as ethanol and butanol, esters such as ethyl acetate, and halogenated hydrocarbons such as dichloromethane and chlorobenzene.

The mixed solvent may be used in an amount to the extent that the raw material including the alkali metal sulfide and the sulfur compound becomes a solution or slurry by addition of the mixed solvent. Normally, an amount (total amount) of the raw material relative to 1 liter of the mixed solvent is approximately 0.001 to 1 kg, preferably 0.005 to 0.5 kg, and particularly preferably 0.01 to 0.3 kg.

[Alkali Metal Sulfide]

The alkali metal sulfide includes $Li_2S$ (lithium sulfide), and $Na_2S$ (sodium sulfide), and lithium sulfide is preferable. Here, the alkali metal sulfide may be used singly or used as a mixture of two or more.

Lithium sulfide can be used without particular limitation, but highly pure one is preferable. Lithium sulfide can be produced by the methods disclosed in JP-A-H07-330312, JP-A-H09-283156, JP-A-2010-163356, JP-A-2011-084438, and JP-A-2011-136899.

Specifically, lithium hydroxide and hydrogen sulfide are reacted in a hydrocarbon organic solvent at a temperature of 70° C. to 300° C. to generate lithium hydrosulfide, and then, lithium sulfide can be synthesized by removal of hydrogen sulfide from the reaction solution (JP-A-2010-163356).

Alternatively, lithium hydroxide and hydrogen sulfide is reacted in water solvent at a temperature of 10° C. to 100° C. to generate lithium hydrosulfide, and then, lithium sulfide can be synthesized by removal of hydrogen sulfide from the reaction solution (JP-A-2011-084438).

Lithium sulfide preferably contains a lithium salt of sulfur oxide in a total amount of 0.15 mass % or less, with more preferably 0.1 mass % or less, and lithium N-methylaminobutyrate in an amount of 0.15 mass % or less, with more preferably 0.1 mass % or less. The solid electrolyte which is produced by the melt quenching method or mechanical milling method from lithium sulfide that contains the lithium salt of sulfur oxide in a total amount of 0.15 mass % or less becomes a glass electrolyte (perfect amorphous). On the other hand, when the total amount of the lithium salt of sulfur oxide exceeds 0.15 mass %, the resultant electrolyte firstly obtained may be a crystalized substance.

Further, when the content of lithium N-methylaminobutyrate is 0.15 mass % or less, a degradation product of lithium N-methylaminobutyrate does not deteriorate the cycle performance of the lithium ion battery. As mentioned above, by the use of lithium sulfide in which impurities are reduced, highly ionic conductive electrolyte can be obtained.

If lithium sulfide is produced in accordance with the above-mentioned JP-A-H07-330312 or JP-A-H09-283156, it is preferable to purify the lithium sulfide since it contains a lithium salt of sulfur oxide, and other impurities.

On the other hand, lithium sulfide which is produced by the method of producing lithium sulfide disclosed in JP-A-2010-163356, contains very small amount of a lithium salt of sulfur oxide and other impurities, and therefore, it may be used without conducting purification.

As a preferred purification method, the purification method disclosed in WO2005/40039 may be mentioned, for example. Specifically, lithium sulfide obtained as above is washed by using an organic solvent at a temperature of 100° C. or higher.

Further, lithium sulfide obtained by the method disclosed in JP-A-2011-136899 is preferable. Lithium sulfide that has a large specific surface area can be prepared by modifying lithium sulfide using a solvent containing a polar solvent.

The alkali metal sulfide particles used as the raw material have a particle size of preferably 100 μm or less, more preferably 80 μm or less, and further preferably 50 μm or less.

The particle size of the alkali metal sulfide particles is obtained by measuring by the laser difractometry using Mastersizer 2000 manufactured by Malvern Instruments, and then, calculating from the volume average particle size. This measurement is preferably conducted directly in a slurry state without undergoing drying. Once they are dried, apparent large particle size may be obtained because aggregation of the particles takes place during drying. The alkali metal sulfide particles preferably have a pore volume of 0.01 mL/g or more. If the pore volume is 0.01 mL/g or more, the reaction with the raw materials other than the alkali metal sulfide particles is more likely to proceed easily, as well as the alkali metal sulfide particles are easily pulverized and the reaction is even more likely to proceed easily.

[Sulfur Compound]

As the sulfur compound, phosphorous sulfides such as $P_2S_3$ (diphosphorus trisulfide) and $P_2S_5$ (phosphorus pentasulfide), $SiS_2$ (silicon sulfide), $Al_2S_3$ (aluminum sulfide), $GeS_2$ (germanium sulfide), $B_2S_3$ (diboron trisulfide), and the like can be used. Preferred is phosphorous sulfides, and $P_2S_5$ is particularly preferable. Here, the sulfur compound may be used singly or used as a mixture of two or more.

$P_2S_5$ that is produced industrially and on the market may be used without particularly limitation.

As to the blending ratio of the alkali metal sulfide and the sulfur compound, the molar ratio of alkali metal sulfide: sulfur compound is, for example, 60:40 to 90:10, preferably alkali metal sulfide: sulfur compound=68:32 to 80:20 (molar ratio), more preferably alkali metal sulfide: sulfur compound=74:26 to 76:24 (molar ratio). The solid electrolyte having high ionic conductivity and hydrolysis resistance tends to be easily obtained.

Most preferably, alkali metal sulfide is lithium sulfide, and the sulfur compound is phosphorus pentasulfide.

[Other Raw Materials]

The raw material of the sulfide-based solid electrolyte includes, for example, a halogen compound in addition to the above-mentioned alkali metal sulfide and the sulfur compound.

The halogen compound includes LiF, LiCl, LiBr, LiI, $BCl_3$, $BBr_3$, $BI_3$, $AlF_3$, $AlBr_3$, $AlI_3$, $AlCl_3$, $SiF_4$, $SiCl_4$, $SiCl_3$, $Si_2Cl_6$, $SiBr_4$, $SiBrCl_3$, $SiBr_2Cl_2$, $SiI_4$, $PF_3$, $PF_5$, $PCl_3$, $PCl_5$, $PBr_3$, $PI_3$, $P_2Cl_4$, $P_2I_4$, $SF_2$, $SF_4$, $SF_6$, $S_2F_{10}$, $SCl_2$, $S_2Cl_2$, $S_2Br_2$, $GeF_4$, $GeCl_4$, $GeBr_4$, $GeI_4$, $GeF_2$, $GeCl_2$, $GeBr_2$, $GeI_2$, $AsF_3$, $AsCl_3$, $AsBr_3$, $AsI_3$, $AsF_5$, $SeF_4$, $SeF_6$, $SeCl_2$, $SeCl_4$, $Se_2Br_2$, $SeBr_4$, $SnF_4$, $SnCl_4$, $SnBr_4$, $SnI_4$, $SnF_2$, $SnCl_2$, $SnBr_2$, $SnI_2$, $SbF_3$, $SbCl_3$, $SbBr_3$, $SbI_3$, $SbF_5$, $SbCl_5$, $PbF_4$, $PbCl_4$, $PbF_2$, $PbCl_2$, $PbBr_2$, $PbI_2$, $BiF_3$, $BiCl_3$, $BiBr_3$, $BiI_3$, $TeF_4$, $Te_2F_{10}$, $TeF_6$, $TeCl_2$, $TeCl_4$, $TeBr_2$, $TeBr_4$, $TeI_4$, NaI, NaF, NaCl, and NaBr. The lithium compound and the phosphorous compound are preferable. Also, bromine compound is preferable. Specifically, LiCl, LiBr, LiI, $PCl_5$, $PCl_3$, $PBr_5$ and $PBr_3$ are preferable, with more preferably LiCl, LiBr, LiI and $PBr_3$, and with particularly preferably LiBr and $PBr_3$.

In addition to the above, as the raw material of the sulfide-based solid electrolyte, a compound which decreases a glass transition temperature (vitrification accelerating agent) may be used. The vitrification accelerating agent includes, for example, inorganic compounds such as $Li_3PO_4$, $Li_4SiO_4$, $Li_4GeO_4$, $Li_3BO_3$, $Li_3AlO_3$, $Li_3CaO_3$, $Li_3InO_3$, $Na_3PO_4$, $Na_4SiO_4$, $Na_4GeO_4$, $Na_3BO_3$, $Na_3AlO_3$, $Na_3CaO_3$, and $Na_3InO_3$.

In addition to the above, elemental phosphorous (P), elemental sulfur (S), silicon (Si), $LiBO_2$ (lithium metaborate), $NaBO_2$ (sodium metaborate), $POCl_3$, $POBr_3$, and the like may also be used.

When the above-mentioned halogen compound is used as the raw material, the amount of the halogen compound is preferably [(alkali metal sulfide plus sulfur compound): halogen compound]=50:50 to 99:1 (molar ratio), more preferably 70:30 to 98:2 (molar ratio), further preferably 85:15 to 98:2 (molar ratio), and particularly preferably 90:10 to 98:2 (molar ratio).

When the above-mentioned vitrification accelerating agent is used as the raw material, the amount of the vitrification accelerating agent expressed as vitrification accelerating agent/(alkali metal sulfide plus sulfur compound plus halogen compound) is preferably 1 to 10 mol %, and more preferably 1 to 5 mol %.

[Method of Contact and Conditions for Contact]

The temperature at the time of contacting the raw materials in the mixed solvent including the hydrocarbon solvent and the polar aprotic solvent is normally 60 to 300° C., preferably 100 to 250° C., and more preferably 100 to 200° C. The time of contact is normally 5 minutes to 50 hours, and preferably 10 minutes to 40 hours.

It is preferable to do stirring during the contact. The contact is preferably conducted under inert gas atmosphere such as nitrogen or argon. The inert gas preferably has a dew point of −20° C. or lower, and particularly preferably −40° C. or lower. The pressure is normally atmospheric pressure to 100 MPa, and preferably atmospheric pressure to 20 MPa.

According to this method, a solid electrolyte can be produced using a general-purpose equipment such as a usual reaction vessel and an autoclave. Namely, a special equipment such as one which can withstand high temperature is not necessary. In addition, use of the hydrocarbon solvent can reduce an amount of the solvent remaining in the solid electrolyte.

The method of contact is not particularly limited, and a conventional apparatus such as a reaction vessel equipped with a stirrer, for example, can be used. Here, in the method of production according to one embodiment of the invention, a solid electrolyte can efficiently be produced without using a special mixing and pulverizing apparatus such as a bead mill. However, an apparatus as mentioned below may be used, as required.

The method of producing a sulfide-based solid electrolyte according to one aspect of the invention includes a reaction step of reacting raw materials containing an alkali metal sulfide and a sulfur compound in a mixed solvent of a hydrocarbon solvent and a polar aprotic solvent while pulverizing the raw materials, and a reaction step of reacting raw materials containing an alkali metal sulfide and a sulfur compound in a mixed solvent of a hydrocarbon solvent and a polar aprotic solvent, wherein these reaction steps are carried out alternately, for example.

For instance, the above-mentioned method of producing a sulfide-based solid electrolyte can be carried out by reacting in a pulverizer raw materials in a mixed solvent of a hydrocarbon solvent and a polar aprotic solvent while pulverizing the raw materials to synthesize a sulfide-based solid electrolyte; and separately reacting in a reaction vessel raw materials in the mixed solvent of the hydrocarbon solvent and the polar aprotic solvent to synthesize a sulfide-based solid electrolyte, while circulating the reacting raw materials between the pulverizer and the reaction vessel.

FIG. 1 shows an example of an apparatus that can be used for the above-mentioned method of production.

In the apparatus 1, a mixed solvent of a hydrocarbon solvent and a polar aprotic solvent, and raw materials including an alkali metal sulfide and a sulfur compound are supplied to a pulverizer 10 and a reaction vessel 20. Hot water (HW) is introduced into and discharged from a heater 30 (RHW). While the temperature in the pulverizer 10 is kept by the heater 30, the raw materials are reacted in the mixed solvent under pulverization to synthesize a sulfide-based solid electrolyte. While the temperature in the reaction vessel 20 is kept by an oil bath 40, the raw materials are reacted in the mixed solvent to synthesize the sulfide-based solid electrolyte. The temperature in the reaction vessel 20 is measured with a thermometer (Th). During this, the reaction system is stirred by a stirring blade 24 rotated by a motor (M) such that slurry composed of the raw materials and the solvent is prevented from precipitation. Cooling water (CW) is introduced into and discharged from a cooling tube 26 (RCW). The cooling tube 26 cools and liquefies the vaporizing solvent in a container 22, to return the liquefied solvent to the container 22. During synthesis of the sulfide-based solid electrolyte in the pulverizer 10 and the reaction vessel 20, the reacting raw materials are circulated between the pulverizer 10 and the reaction vessel 20 through connecting tubules 50 and 52 by a pump 54. Temperature of the raw materials and the mixed solvent which are supplied to the pulverizer 10 is measured with a thermometer (Th) equipped with the second connecting tubule before the pulverizer 10.

As the pulverizer 10, a tumbling mill (rolling mill), an oscillating mill, a vibrating mill and a bead mill can be mentioned, for example.

Here, when the pulverizer contains balls, the balls are preferably made of zirconium, toughened alumina, or alumina, in order to avoid contamination of the sulfide-based solid electrolyte with materials which are generated due to abrasion of the balls and the container. Also, in order to avoid intrusion of the balls from the pulverizer 10 into the reaction vessel 20, a filter that separates the balls from the raw materials and the mixed solvent may be provided at the pulverizer 10 or the first connecting tubule 50, as required.

Pulverizing temperature in the pulverizer is preferably 20° C. or higher and 90° C. or lower, and more preferably 20° C. or higher and 80° C. or lower.

The temperature in the container 22 is preferably 60° C. to 300° C., and more preferably 80° C. to 200° C. When it is lower than 60° C., vitrification reaction takes much time, so that the production efficiency is insufficient. When it exceeds 300° C., undesirable crystals may precipitate.

The reaction proceeds faster at a high temperature range, and thus the temperature is preferably made to be high. However, mechanical problems such as abrasion may take place in the pulverizer at a high temperature. Accordingly, it is preferable that the temperature in the reaction vessel is set rather high, and the temperature in the pulverizer relatively low.

The reaction time is normally 5 minutes to 50 hours, and preferably 10 minutes to 40 hours.

Figure 2:
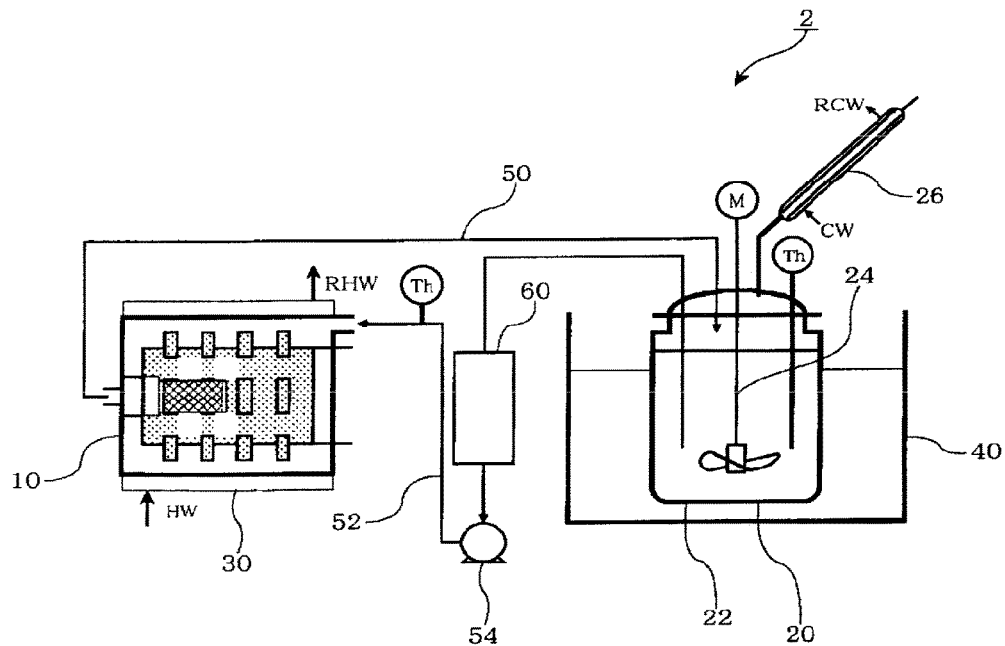
FIG. 2 is an illustration of another example of an apparatus usable for the method of production according to one embodiment of the invention.

As shown in FIG. 2, a heat exchanger 60 (heat exchanging means) may be provided at the second connecting portion 52, and the raw materials and the solvent in a high temperature discharged from the reaction vessel 20 may be fed into the agitator 10 after cooling by the heat exchanger.

The reaction product is dried and the solvent is removed to obtain a sulfide-based solid electrolyte.

By subjecting the resultant sulfide-based solid electrolyte to a heat treatment normally at a temperature of 200° C. or higher and 400° C. or lower, and more preferably 250 to 320° C., the ionic conductivity thereof can increase. It is for the reason that the sulfide-based solid electrolyte which is a glass substance can be made to a sulfide crystalized glass (glass ceramics). The time for the heat treatment is preferably 1 to 5 hours, and particularly preferably 1.5 to 3 hours.

Here, as a preferred aspect, heating in the drying step and heating in the crystallization step may be one heating step, which are not separate heating steps.

During drying the above-mentioned reaction product and removing the solvent, if 100% THF solvent is removed, for example, as Non-Patent document 1, there is a risk of explosion and firing due to condensation of peroxides and the like. However, according to the invention, where a mixed solvent of toluene and THF, for example, is removed, toluene remains at the time of removing THF so that the peroxides are prevented from condensation because the boiling point of toluene is higher than that of THF. The invention also has the above-mentioned advantage. As far as this advantage is concerned, it is also possible that the reaction product is obtained by using only a polar aprotic solvent such as THF, and then, a hydrocarbon solvent such as toluene is added thereto, followed by drying the reaction product and removal of the solvents.

EXAMPLES

Production Example 1

[Production of Lithium Sulfide]

Under a stream of nitrogen, 270 g of toluene as a nonpolar solvent was placed in a 600 mL-separable flask, 30 g of lithium hydroxide (manufactured by Honjo Chemical Corporation) was added thereto. The mixture was kept at a temperature of 95° C. while stirring at 300 rpm with a FULLZONE mixing blade. The resultant slurry was heated up to a temperature of 104° C. while blowing hydrogen sulfide into the slurry at a feed rate of 300 mL/minute. From the separable flask, an azeotropic gas of water and toluene was continuously discharged. The slurry was dehydrated by condensing the azeotropic gas with a condenser equipped out of the system. During this, fresh toluene was continuously supplied to the system in an amount equal to that distilled from the system, to keep the level height of the reaction solution constant.

The water content of the condensate liquid gradually decreased, and distillation of water was not observed after 6 hours from the beginning of the introduction of hydrogen sulfide (the amount of water was 22 mL in total). Here, no water phase was separated from toluene since solids were dispersed in toluene with stirring during the reaction. Then, hydrogen sulfide was changed to nitrogen, and nitrogen was supplied for one hour at a flow rate of 300 mL/minute. Solid constituent was collected by filtration followed by drying to obtain lithium sulfide as white powder.

As the results of analyses of the resultant powder by hydrochloric acid titration and silver nitrate titration, the purity of lithium sulfide was 99.0%. Also, it was confirmed by the X-ray diffraction measurement that no peak other than the crystal pattern of lithium sulfide was observed. The average particle diameter was 450 μm (slurry solution).

Here, the particle diameter of lithium sulfide was measured by LASER diffractometry using Mastersizer 2000 manufactured by Malvern Instruments Ltd., and calculated based on the volume-based average particle diameter.

The specific surface area of the resulting lithium sulfide was measured by the BET method with a nitrogen gas by means of AUTOSORB 6 (manufactured by Sysmex Corporation), and found to be 14.8 m$^2$/g. The fine pore volume was measured by using the same apparatus as that for measuring the specific surface area, and obtained by interpolating to the relative pressure (P/P$_0$) of 0.99 from a measuring point at which the relative pressure (P/P$_0$) is 0.99 or more. The fine pore volume was found to be 0.15 ml/g.

Example 1

Solvent Being Mixed Solvent of Toluene and THF

The inside of the flask with a stirrer was replaced with nitrogen. The flask was charged with 3.37 g of the lithium sulfide obtained in Production Example 1 (taking the purity into consideration, 3.27 g thereof was lithium sulfide) and 5.32 g of diphosphorus pentasulfide (manufactured by Sigma-Aldrich Japan), and 60 mL of dehydrated toluene having a water content of 10 ppm or less and 65 mL of tetrahydrofuran having a water content of 10 ppm (THF; manufactured by Wako Pure Chemical Industries, Ltd.) were added, and the contact was conducted at a temperature of 30° C. (room temperature) for 24 hours.

Solid constituents were separated by filtration, and vacuum dried at a temperature of 120° C. for 40 minutes to prepare a solid electrolyte.

The resultant solid electrolyte had an ionic conductivity of 1.2×10$^{-4}$ S/cm. As a result of the X-ray diffraction (CuKα: λ=1.5418 Å), no peak other than the halo pattern derived from an amorphous product was observed, and it was confirmed that the resultant solid electrolyte was a glass substance.

The ionic conductivity was measured by the following method.

The resultant solid electrolyte was placed in a tablet forming machine, and a pressure of 10 MPa was applied to obtain a formed product. Further, as an electrode, a mix obtained by mixing the carbon and the solid electrolyte at a weight ratio of 1:1 was put on the both sides of the formed product, and a pressure was again applied by the tablet forming machine, whereby a formed product for measurement of the conductivity (diameter: about 10 mm, thickness: about 1 mm) was produced. For this formed product, the ionic conductivity was measured by an AC impedance method.

As the value of conductivity, a numerical value at 25° C. was used.

Example 2

Solvent Being Mixed Solvent of Toluene and THF

A solid electrolyte was produced and evaluated in the same manner as in Example 1 except that a mixed solvent of 115 mL of dehydrated toluene having a water content of 10 ppm or less and 10 mL of dehydrated THF having a water content of 10 ppm or less was used in place of the mixed solvent of the dehydrated toluene and THF.

The resultant solid electrolyte had an ionic conductivity of 1.2×10$^{-4}$ S/cm. As a result of the X-ray diffraction (CuKα: λ=1.5418 Å), no peak other than the halo pattern derived from an amorphous product was observed, and it was confirmed that the resultant solid electrolyte was a glass substance.

Example 3

Solvent Being Mixed Solvent of Toluene and THF

A solid electrolyte was produced and evaluated in the same manner as in Example 1 except that in addition to lithium sulfide and phosphorous pentasulfide, 1.41 g of LiBr (manufactured by Sigma-Aldrich Japan) was further added as a raw material.

The resultant solid electrolyte had an ionic conductivity of 2.4×10$^{-4}$ S/cm.

Example 4

Toluene Plus THF

In Preparation Example 1, the drying after synthesis of Li$_2$S was not carried out, and the resultant Li$_2$S slurry was obtained in the state of a toluene slurry in an amount of 34 g. The slurry contained 3.37 g of Li$_2$S (taking the purity into consideration, 3.27 g thereof was lithium sulfide).

To the resultant Li$_2$S slurry, 5.32 g of phosphorous pentasulfide (manufactured by Sigma-Aldrich Japan), 1.41 g of LiBr (manufactured by Sigma-Aldrich Japan), and 87 mL of tetrahydrofuran in which a water content was 10 ppm (THF: Wako Pure Chemical Industries, Inc.) were added, and contacted at a temperature of 30° C. (room temperature) for 24 hours. The mixed ratio (volume ratio) of toluene and THF was 38:87 in this contact reaction.

The solid constituent was separated by filtration, followed by vacuum drying at a temperature of 120° C. for 40 minutes to obtain a solid electrolyte.

The resultant solid electrolyte was evaluated in the same manner as in Example 1. The ionic conductivity was 1.3×10$^{-4}$ S/cm. As a result of the X-ray diffraction (CuKα: λ=1.5418 Å), no peak other than the halo pattern derived from an amorphous product was observed, and it was confirmed that the resultant solid electrolyte was a glass substance.

Comparative Example 1

Solvent Being THF Alone

A solid electrolyte was produced and evaluated in the same manner as in Example 1 except that only THF was used in place of the mixed solvent of the dehydrated toluene and THF The resultant solid electrolyte had an ionic conductivity of 1.3×10$^{-4}$ S/cm. As a result of the X-ray diffraction (CuKα: λ=1.5418 Å), no peak derived from Li$_2$S was observed, and it was confirmed that Li$_2$S disappeared.

Comparative Example 2

Solvent Being Toluene Alone

A solid electrolyte was produced and evaluated in the same manner as in Comparative Example 1 except that dehydrated toluene was used in place of THF As a result of the X-ray diffraction as to the resultant solid electrolyte, a peak derived from the raw material of $Li_2S$ was observed, and it was found that the reaction hardly proceeded.

Comparative Example 3

Solvent Being Toluene Alone

A solid electrolyte was produced and evaluated in the same manner as in Comparative Example 1 except that 1250 mL of dehydrated toluene was used in place of THF, lithium sulfide and phosphorous pentasulfide were used in an amount of 33.3 g and 53.2 g, respectively, an apparatus shown in FIG. 1 was used in place of the flask equipped with a stirrer, and a slurry was circulated between a flask equipped with a stirrer and a bead mill to allow pulverizing reaction at a temperature of 60° C. for 12 hours.

The resultant solid electrolyte had a conductivity of $1.3 \times 10^{-4}$ S/cm. As a result of an X-ray diffraction measurement, a peak of $Li_2S$ did not remain.

THF used as a solvent has a firing point of −14.5° C., an ignition point of 321° C., and an explosion limit of 2 to 11.8 vol %. On the other hand, toluene used as a solvent has a firing point of 4° C., an ignition point of 480° C., and an explosion limit of 1.1 to 7.1 vol %. Namely, THF has a lower firing point and a lower ignition point than toluene has, and a wider range of an explosion limit than toluene has.

Therefore, the production of a solid electrolyte using a mixed solvent of THF and toluene has a less risk than the production of a solid electrolyte using THF alone as a solvent. In all the above-mentioned examples, the reaction was carried out using a mixed solvent of THF and toluene. Therefore, it can be said that the reaction processes in the above-mentioned examples have less risk than the reaction process using THF in an amount of 100% as a solvent.

Example 5

Solvent Being Mixed Solvent of Toluene and THF

By using the apparatus shown in FIG. 1, 750 mL of dehydrated toluene having a water content of 10 ppm or less and 500 mL of tetrahydrofuran having a water content of 10 ppm (THF: manufactured by Wako Pure Chemical Industries, Inc.) were added to 33.2 g of lithium sulfide prepared in Preparation Example 1 and 53.2 g of phosphorous pentasulfide (manufactured by Sigma-Aldrich Japan). The resultant slurry was circulated between the flask equipped with a stirrer and the bead mill, whereby they were brought into contact with each other at a temperature of 60° C. for 2 hours.

The solid constituent was separated by filtration, followed by vacuum drying at a temperature of 120° C. for 40 minutes to obtain a solid electrolyte.

The resultant solid electrolyte had an ionic conductivity of $1.2 \times 10^{-4}$ S/cm. As a result of an X-ray diffraction measurement (CuKα: λ=1.5418 Å), no peak derived from $Li_2S$ was observed, and it was confirmed that $Li_2S$ disappeared.

Example 6

Solvent Being Mixed Solvent of Toluene and Diethoxyethane

A solid electrolyte was produced by the same method used in Example 5 except that 500 mL of diethoxyethane having a water content of 10 ppm was used in place of 500 mL of tetrahydrofuran.

The resultant solid electrolyte had an ionic conductivity of $1.2 \times 10^{-4}$ S/cm. As a result of an X-ray diffraction measurement (CuKα: λ=1.5418 Å), no peak derived from $Li_2S$ was observed, and it was confirmed that $Li_2S$ disappeared.

Example 7

Solvent Being Mixed Solvent of Toluene and Isobutyronitrile

A solid electrolyte was produced by the same method used in Example 5 except that 500 mL of isobutyronitrile having a water content of 10 ppm was used in place of 500 mL of tetrahydrofuran.

The resultant solid electrolyte had an ionic conductivity of $1.0 \times 10^{-4}$ S/cm. As a result of an X-ray diffraction measurement (CuKα: λ=1.5418 Å), no peak derived from $Li_2S$ was observed, and it was confirmed that $Li_2S$ disappeared.

Example 8

Solvent Being Mixed Solvent of Toluene and Isobutyronitrile

By using the apparatus shown in FIG. 1, 750 mL of dehydrated toluene having a water content of 10 ppm or less and 500 mL of isobutyronitrile having a water content of 10 ppm were added to 33.2 g of lithium sulfide prepared in Production Example 1, 53.2 g of phosphorous pentasulfide (manufactured by Sigma-Aldrich Japan), and 14.1 g of LiBr (manufactured by Sigma-Aldrich Japan). The resultant slurry was circulated between the flask equipped with a stirrer and the bead mill to bring them into contact with each other at a temperature of 60° C. for 2 hours.

The solid constituent was separated by filtration, followed by vacuum drying at a temperature of 120° C. for 40 minutes to obtain a solid electrolyte.

The resultant solid electrolyte had an ionic conductivity of $3.2 \times 10^{-4}$ S/cm. As a result of an X-ray diffraction measurement (CuKα: λ=1.5418 Å), no peak derived from $Li_2S$ was observed, and it was confirmed that $Li_2S$ disappeared.

The Japanese application specification which priority under the Paris Convention is claimed based on are incorporated herein by reference in its entirety.

The invention claimed is:

1. A method of producing a sulfide-based solid electrolyte comprising:
   contacting an alkali metal sulfide with a sulfur compound without pulverizing in a mixed solvent of an aromatic hydrocarbon solvent and a polar aprotic solvent, wherein:
   the polar aprotic solvent is at least one of an ether solvent and a nitrile solvent, and a volume ratio of the aromatic hydrocarbon solvent to the polar aprotic solvent (aromatic hydrocarbon solvent: polar aprotic solvent) is 95:5 to 5:95.

2. The method of producing a sulfide-based solid electrolyte according to claim 1, wherein the aromatic hydrocarbon solvent is an aromatic hydrocarbon solvent represented by the following formula (1):

$$Ph-(R)_n \tag{1}$$

wherein Ph is an aromatic hydrocarbon group, R is an alkyl group, and n is an integer selected from 1 to 5.

3. The method of producing a sulfide-based solid electrolyte according to claim 1, wherein the polar aprotic solvent is an ether solvent.

4. The method of producing a sulfide-based solid electrolyte according to claim 3, wherein the alkali metal sulfide is lithium sulfide.

5. The method of producing a sulfide-based solid electrolyte according to claim 4, wherein the sulfur compound is phosphorous sulfide.

6. The method for producing a sulfide-based solid electrolyte according to claim 4, wherein the sulfur compound is phosphorous pentasulfide, and the alkali metal sulfide and the sulfur compound are brought into contact at a molar ratio of 74:26 to 76:24.

7. The method for producing a sulfide-based solid electrolyte according to claim 3, wherein the alkali metal sulfide and the sulfur compound are brought into contact at a molar ratio of 74:26 to 76:24.

8. The method of producing a sulfide-based solid electrolyte according to claim 1, wherein the alkali metal sulfide is lithium sulfide.

9. The method of producing a sulfide-based solid electrolyte according to claim 8, wherein the sulfur compound is phosphorous sulfide.

10. The method for producing a sulfide-based solid electrolyte according to claim 1, wherein the alkali metal sulfide and the sulfur compound are brought into contact at a molar ratio of 74:26 to 76:24.

11. The method of producing a sulfide-based solid electrolyte according to claim 1, wherein the contacting is carried out at a temperature of 20° C. or higher and 60° C. or lower.

12. The method of producing a sulfide-based solid electrolyte according to claim 1, wherein the aromatic hydrocarbon solvent is toluene, xylene, or ethylbenzene.

13. The method of producing a sulfide-based solid electrolyte according to claim 1, wherein the polar aprotic solvent comprises an ether solvent selected from anisole, diethoxyethane, diethyl ether, and tetrahydrofuran.

14. The method of producing a sulfide-based solid electrolyte according to claim 1, wherein the polar aprotic solvent comprises a cyclic ether solvent.

15. The method of producing a sulfide-based solid electrolyte according to claim 1, wherein the polar aprotic solvent comprises tetrahydrofuran.

16. The method of producing a sulfide-based solid electrolyte according to claim 1, wherein the polar aprotic solvent comprises isobutyronitrile or acetonitrile.

17. The method of producing a sulfide-based solid electrolyte according to claim 1, wherein contacting the alkali metal sulfide with the sulfur compound comprises contacting the alkali metal sulfide, the sulfur compound, and a halogen compound.

18. The method of producing a sulfide-based solid electrolyte according to claim 1, further comprising drying a reaction product obtained by contacting the alkali metal sulfide with the sulfur compound to remove the mixed solvent.

19. The method of producing a sulfide-based solid electrolyte according to claim 1, further comprising crystallizing a reaction product obtained by contacting the alkali metal sulfide with the sulfur compound by a heat treatment.

20. The method of producing a sulfide-based solid electrolyte according to claim 1, further comprising drying and crystallizing a reaction product obtained by contacting the alkali metal sulfide with the sulfur compound in one heating step.

* * * * *